(12) United States Patent  (10) Patent No.: US 6,370,287 B1
Liu  (45) Date of Patent: Apr. 9, 2002

(54) COMPACT FIBER OPTICAL CIRCULATOR

(76) Inventor: Zhimin Liu, 1008 Stewart Dr., Sunnyvale, CA (US) 94086

( * ) Notice: Subject to any disclaimer, the term of this patent is extended or adjusted under 35 U.S.C. 154(b) by 0 days.

(21) Appl. No.: 09/510,120

(22) Filed: Feb. 22, 2000

Related U.S. Application Data

(60) Provisional application No. 60/120,905, filed on Feb. 22, 1999.

(51) Int. Cl.[7] .............................. G02B 6/00; G02F 1/09
(52) U.S. Cl. ......................................... 385/11; 359/280
(58) Field of Search .......................... 385/11, 34, 36; 359/384, 280, 281, 282, 283

(56) References Cited

U.S. PATENT DOCUMENTS

| | | | | |
|---|---|---|---|---|
| 5,204,771 A | * | 4/1993 | Koga | 359/281 |
| 6,175,448 B1 | * | 1/2001 | Xie et al. | 359/497 |
| 6,178,044 B1 | * | 1/2001 | Li et al. | 359/497 |
| 6,226,115 B1 | * | 5/2001 | Shirasaki et al. | 359/280 |
| 6,285,499 B1 | * | 9/2001 | Xie et al. | 359/484 |
| 6,310,989 B1 | * | 10/2001 | Liu | 385/11 |

* cited by examiner

*Primary Examiner*—Loha Ben
*Assistant Examiner*—Saeed Seyrafi
(74) *Attorney, Agent, or Firm*—Bo-In Lin

(57) ABSTRACT

This invention discloses an optical circulator. The optical circulator includes a first set of optical components having a birefringent crystal, a pair of half wave plates and the Faraday rotator to separate and then polarize the light beam into projection-direction ready polarization components. These projection-direction ready polarization components are suitable for entering into a projection-direction optical-processing-optical device, e.g., a Wollaston prism, to generate the projecting-to-exit-port beam components. The circulator then employs a set of reciprocal components of the first set of optical components to carry out reciprocal polarization rotations and beam component merging processes to transmit an output beam to the exit port by projecting the beam components and the merged beam along the projecting-to-exit port direction.

4 Claims, 3 Drawing Sheets

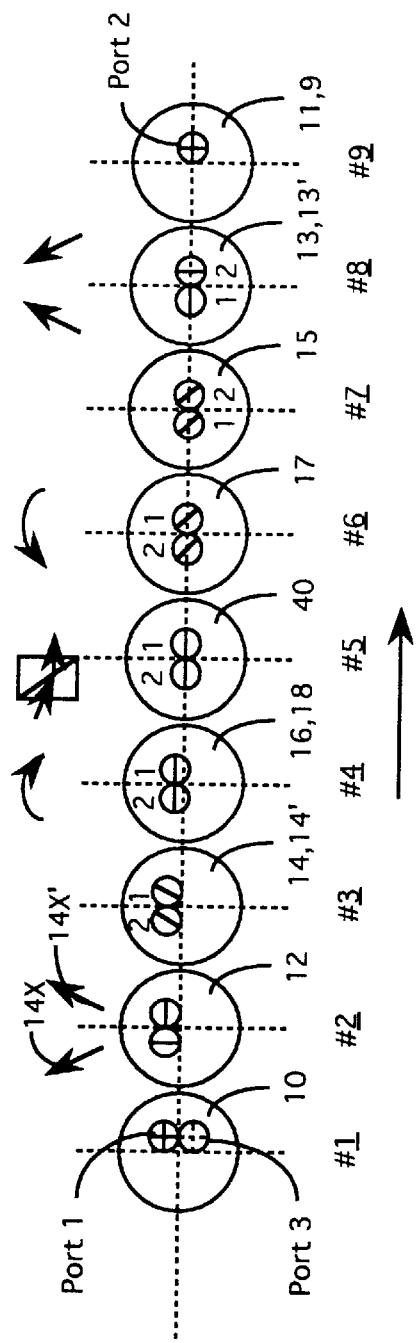
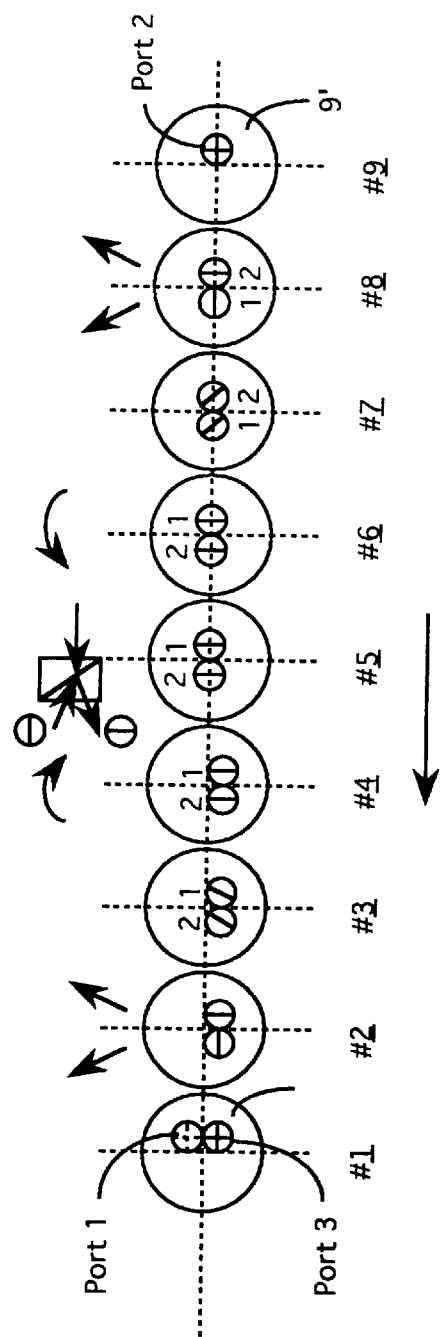
FIG. 2A
FIG. 2B

US 6,370,287 B1

COMPACT FIBER OPTICAL CIRCULATOR

This Formal Application claims a Priority Date of Feb. 22, 1999 benefited from a Provisional Application Ser. No. 60/120,905 filed by the same Applicant of this Application on Feb. 22, 1999.

FIELD OF THE INVENTION

The present invention relates generally to an optical circulator for fiber optic communication systems. More particularly, this invention relates to a low cost compact circulator.

BACKGROUND OF THE INVENTION

In order to reduce the size of an optical circulator to make more compact circulators for various fiber optical applications, optical components of higher prices are often required. Thus, higher production costs are now encountered by the fiber optic industries when optical circulators are manufactured with reduced size. Specifically, higher material costs are resulted from the use of single fiber collimators with relatively large birefringent crystals and Faraday rotators. Since optical circulators are now applied broadly in fiber optic communication systems, cost reduction becomes an important subject. A compact optical circulator manufactured with lower cost can benefit the applications of the optical circulator in bi-directional communication, dense wavelength division multiplexing (WDM) and dispersion compensation.

An optical circulator is employed to transfer a light beam in a sequential order from one port to another. A circulator has at least three optical ports. These ports can be accessed in such order that when a light beam is caused to enter into an optical port, this light-beam after passing through the circulator to exit from a next optical port. For example, a first optical beam enters the circulator through the first port of an optical circulator exits from the second port; an optical beam enters the circulator from a second port exits from the third port. An optical circulator is an important passive device that has a non-reciprocal function. Optical circulators can be divided into two types, one with perfectly circular propagation structure and the other with an imperfectly circular propagation structure. The latter is also referred to as a quasi-circulator or as a circulator. In most applications, a perfectly circular propagation structure is not necessary. To apply a quasi-circulator to optical fiber systems, various kind of structure of polarization-independent optical circulators, including quasi-circulators, have been developed. However, in the fiber optical industries, a person of ordinary skill in the art is still challenged by the tasks of making a compact optical circulator with reduced size and meanwhile keeping a low production cost.

Therefore, a need still exists in the art of manufacturing and designing the fiber optic circulator to provide improved circulator configuration. Specifically, novel and improved circulator configurations utilizing components of lower cost are needed to resolve the difficulties and limitations encountered by the fiber optical industries such that compact fiber optical circulator can be manufactured at a low production cost.

SUMMARY OF THE PRESENT INVENTION

It is therefore an object of the present invention to provide an improved design and configuration for manufacturing and assembling a fiber optic circulator with reduced volume and lower costs such that the aforementioned difficulties and limitations in the prior art can be overcome.

Specifically, it is an object of the present invention to provide a circulator implemented with improved configuration by employing a first set of optical components for separating the beam into to two beam components and adjusting the, polarization angles, generally referred to as state of polarization. The beam components are prepared to have state of polarization for projecting toward the exit-port at a proper angle such that the fiber in the exit port can receive. A polarization-dependent beam projection means, e.g., a Wollaston prism or a Rochon prism, is employed to project the beam components to the exit port along a direction with a projection angle compatible with the fiber at the exit port. Then a second set of optical components arranged in reciprocal order of the first set of optical components. This second set of optical components are employed for readjusting the state of polarization and for merging the beam components according to a reversed beam processing sequences into a light beam identical to the input beam and exit from the output port Another object of the present invention is to provide a circulator with improved configuration by taking advantage of the non-reciprocal characteristic of Faraday rotator coupled with the polarization-dependent projection direction of a Wollaston or Rochon prism to symmetrically transmit a beam backward from the second port to the third port. The size of the birefringent crystals is reduced and savings in production costs are achieved.

Briefly, in a preferred embodiment, the present invention includes an optical circulator. The optical circulator includes a first eccentric dual fiber capillary having a first and a third optical port. The circulator further includes a first birefringent crystal coupled to the first eccentric dual fiber capillary for separating an input optical beam entering from the first port into an ordinary beam component (e-component) having a first polarization keeping an original optical path of the optical beam and an extraordinary beam component (e-component) having a second polarization perpendicular to the first polarization for transmitting in a separated optical path symmetrical to a centerline of the optical circulator. The circulator further includes a first pair of half wave plates (HWPs) comprising a first o-half-wave-plate and a first e-half-wave-plate coupled to the first birefringent crystal for receiving the o-component and e-component respectively for effecting angular rotations, i.e., changing the state of polarization, for aligning the first polarization of the o-component and the second polarization of the e-component into an aligned polarization. The circulator further includes a first Faraday rotator coupled to the first pair of half wave plates for rotating the aligned polarization of the o-component and the e-component into a projection-to-exit port ready polarization relative to the centerline of the circulator. The Wollaston prism coupled to the Faraday rotator for projecting the o-component and the e-component into an exit port projection direction. The circulator further includes a second Faraday rotator coupled to the Wollaston prism for rotating the o-component and e-component into a reciprocally-symmetrical polarization relative to the aligned polarization. The circulator further includes a reciprocal beam polarization and merging means coupled to the second Faraday rotator wherein the reciprocal beam polarization and merging means comprising a second pair of half wave plates identical to the first pair of half wave plates coupled to a second birefringent crystal identical to the first birefringent crystal, the second birefringent crystal in turn coupled to a eccentric single fiber capillary having a second optical port wherein the second half wave plate, the second birefringent crystal and the eccentric single fiber capillary arrange in reciprocal order relative to the first eccentric dual-fiber capillary, the first birefringent crystal and the first pair of half wave plates for reciprocally rotating polarization of the o-component and the e-component and for merging the o-component and e-component into an output optical beam identical to the input optical beam for projecting from the second optical port along the exit port projection direction disposed on the eccentric fiber capillary.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 2A and 2B show the sequences of polarization states and relative position of the beam components for a forward projecting and backward projecting beams respectively transmitted in the circulator shown in FIGS. 1A and 1B;

FIGS. 3B-1 and 3B-2 depicts the changes of the state of polarization, i.e., rotations of the polarization angles, of the Faraday rotators; and FIGS. 3C-1 and 3C-2 depicts the polarization-dependent projection direction of the Wollaston prism implemented in this invention.

DETAILED DESCRIPTION OF THE INVENTION

Figure 1A:
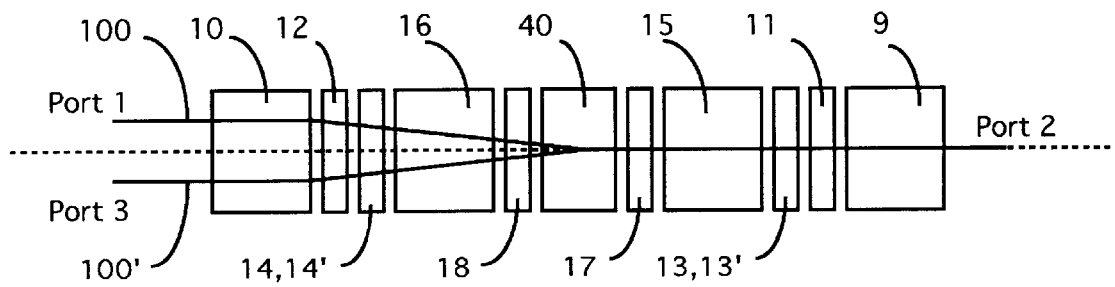
FIGS. 1A and 1B are respectively a side cross sectional view and a top view of an optical circulator of the present invention.
Figure 1B:
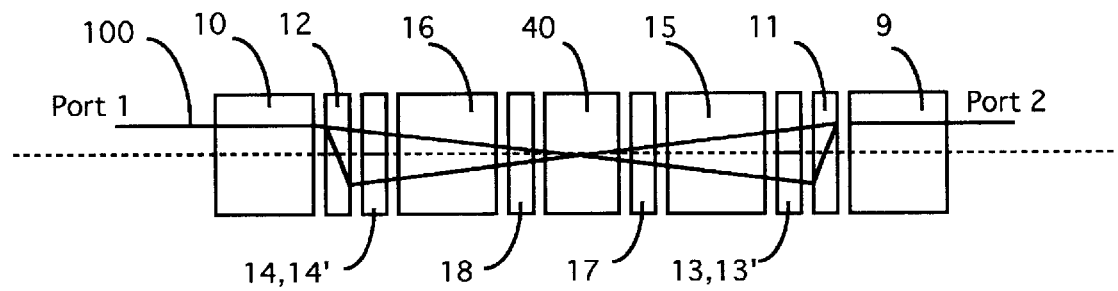

Referring to FIG. 1A for a side cross sectional view and FIG. 1B for a top view of an optical circulator of this invention. In FIG. 1A, port 1 and port 3 are provided at the left end of the circulator and a port 2 is provided at the right end of the circulator. A light beam 100 entering into the circulator from port 1 on the left end, after passing through the circulator, exits from the port 2. And, a light beam 100' entering into the circulator from port 2 on the right end, after traveling through the circulator, exists from port 3.

Figures 1, 3A:
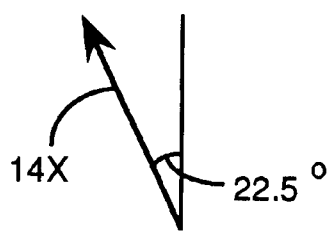
FIGS. 3A-1 and 3A-2 depicts the optical axis orientations of the half wave plates (HWPs) implemented in the circulator of FIGS. 1A and 1B.

Referring to FIGS. 1A and 2A, the light beam 100 entering into port 1 disposed on a dual fiber eccentric capillary 10 as an incident light with random state of polarization (process #1). FIG. 2A shows the light path through different optical components and the polarization changes for light beam 100 transmitting from left to the right, i.e., port 1 to port 2. After entering to the birefringent crystal 12, the light 100 is separated into mutually perpendicular ordinary and extraordinary components, i.e., o-component and e-component (process#2). The e-component moves to the position symmetrical to the central line of collimate lenses, e.g., the GRIN lenses 15 and 16. A pair of half wave plates, 14 and 14' having optical axes shown as 14X and 14X" for changing the state of polarization (SOP) of the e-component and o-component respectively from mutual perpendicular orientation into same polarization orientation (process#3). FIG. 3A shows the angles of optical axes 14X and 14X'. The light 100, comprising now of an o-component and e-component, after being collimated by the GRIN lens 16, enters into a Faraday rotator 18 with non-reciprocal rotation characteristic, rotates these two components by 45 degrees (process#4). Since port 1 is located away from horizontal and vertical centerlines of the lenses, the collimated beam 100 comprising of both the e o-component and e-component are transmitted with a small angle declining toward the centerlines. After passing through a Wollaston prism 40, these declined optical beams become parallel to the central horizontal line because of the special state of polarization of these beams (process#5). More descriptions of the functions of the Wollaston prism 40 are shown in FIG. 3C and described below. These beams, now parallel to the horizontal center line, enter into a Faraday rotator 17, and again, the polarization of these beams are rotated with a 45-degree rotation (process#6) and focused by a second GRIN lens 15(process#7). A second pair of half plates 13 and 13' is employed to change the SOP. The HWPs 13 and 13' effect a 45-degree rotation for both of these beam components to a vertical and a horizontal polarization orientations for the ordinary-component and extraordinary component relative to the centerline of the crystal 11 respectively (process#8). Then, these two components are entering into a second birefringent crystal 11 that carries out a reciprocal function of birefringent crystal 12 to combine these two components of beam into a single output beam (process#9). The output beam exits from port 2 on a second eccentric fiber capillary 9.

The optical fibers used in the circulators disclosed in this invention are thermal expanded core (TEC) types of fibers. The purpose of employing the TEC fibers is to reduce the divergent angles of the light transmitting through the fiber such that the light would not disperse over the boundary of the first and second half-wave plates employed in the circulator as described above.

Referring to FIG. 2B for the light path and the states of polarization of beam 100' in transmitting from port 2 to port 3. FIG. 2B shows nine beam processes and to some extent, these processes are similar to that described for beam 100 transmitting from port 1 to port 2 shown as processes #1 to #9. Since several of the optical components such as birefringent crystals 11 and 12, the half wave plates 13, 13' and 14,14' and the GRIN lenses 15 and 16 are reciprocal type of optical components, the optical path and state of polarization are processed in a reversed sequence. The light beam 100' entering port 2 and traveling in an opposite direction from that of beam 100. A comparison can be made between FIG. 2A and FIG. 2B to recognize such reversal conditions. Specifically, the reversal condition can be understood readily by examining the SOP and light path of processes #9, #8 and #7 of the light beam 100' and the beam components, shown in FIG. 2B, in passing through components 9, 11, 13, 13' and 15. The underlined designation is to represent that these processes are reciprocal processes when compared with FIG. 2A.

As the light beam components enter the Faraday rotator 17, because it is a non-reciprocal optical component, the process #6', that is not reciprocal to process #6, changes the state of polarization (SOP). The Faraday rotator 17 rotates the light components into polarization angles with both beam components having 45 degrees off from the light beam 100. The o-component and e-component of the beam 100' are aligned along a same polarization orientation. As the beam components enter into the Wollaston lens 40, because of the polarization orientation, and that the beam components are transmitted on the horizontal centerline, the beam components are deflected to have a small downward angle in the light path (process #5'). Then, as the beam components in passing through the Faraday rotator 18 and the GRIN lens 16 are non-reciprocally rotated 45 degrees clockwise and deflected to an optical path below the horizontal centerline (process #4'). Then the beam components generated from the light beam 100' are first processed reciprocally rotated by the half wave plates 14 and 14' (process #3) with the polarization angles rotated. Then, the beam components pass through the birefringent crystal 12 (process #2) with the horizontal and vertical polarization components merged as a single output beam and exits from port 3 (process #1).

According to above descriptions, referring to FIG. 2A, the functions performed by the birefringent crystal 12, half wave plates 14 and 14' and the Faraday rotator 18 are to separate and then polarize the light beam into projection-direction ready polarization components. These projection-direction ready polarization components are suitable for entering into a projection-direction optical-processing-means, e.g., a Wollaston prism, to generate the projecting-to-exit-port beam components. The circulator then employs a set of reciprocal components to carry out reciprocal polarization rotations and beam component merging means to transmit an output beam to the exit port by continuously projecting along the projecting-to-exit port direction.

According to FIGS. 1A, 1B, and 2A, this invention discloses an optical circulator. The circulator includes a first eccentric dual fiber capillary 10 having a first and a third optical port. The circulator further includes a first birefringent crystal 12 coupled to the first eccentric dual fiber capillary 10 for separating an input optical beam 100 entering from the first optical port into an ordinary beam component (o-component) a first polarization keeping an original optical path of the optical beam. Also, the optical beam is separated into an extraordinary beam component (e-component) having a second polarization perpendicular to the first polarization for transmitting in a separated optical path symmetrical to a centerline. The circulator further includes a first pair of half wave plates comprising a first o-half-wave-plate 14 and a first e-half-wave-plate 14'. The half wave plates are coupled to the first birefringent crystal 12 for receiving the o-component and e-component respectively for effecting angular rotations for aligning the first polarization of the o-component and the second polarization of the e-component into an aligned polarization. The circulator further includes a first Faraday rotator 18 coupled to the first plate 14 and 14' for rotating the aligned polarization of the o-component and the e-component into a projection-to-exit port ready polarization. The circulator further includes a Wollaston prism 40 coupled to the first Faraday rotator 18 for projecting the o-component and the e-component into an exit port projection direction. The circulator further includes a second Faraday rotator 17 coupled to the Wollaston prism 40 for rotating the o-component and e-component into a reciprocally symmetrical polarization relative to the aligned polarization. The circulator further includes a reciprocal beam polarization and merging means coupled to the second Faraday rotator 17. The reciprocal beam polarization and merging means comprising a second pair of half wave plates 13 and 13' identical to the first half wave plate. The second pair of half wave plates 13 and 13' are coupled to a second birefringent crystal 11 identical to the first birefringent crystal that in turn coupled to a second eccentric fiber capillary 9 having a second optical port. The second pair of half wave plates 13 and 13', the second birefringent crystal 11 and the second eccentric fiber capillary 9 are arranged in reciprocal order for reciprocally rotating polarization the o-component and the e-component And, the reciprocal beam polarization and merging means is for merging the o-component and e-component into an output optical beam identical to the input optical beam projected from the second optical port disposed on the eccentric fiber capillary.

In essence, an optical circulator is disclosed in this invention. The optical circulator includes a beam separation and polarization means for preparing an incident light into two projection-direction-ready beam components. The optical circulator further includes a polarization-dependent beam projection means for projecting the projection-direction-ready beam components to an exit port-and-fiber direction. The circulator further includes a reciprocal means for reciprocally polarizing and merging the beam components relative to the beam separation and polarization means and projecting a merged beam generated by the reciprocal means to the exit port-and-fiber direction through an exit port. In a preferred embodiment, the polarization-dependent beam projection means comprises a Wallaston prism. In another preferred embodiment, the polarization-dependent beam projection means comprising a Rochon prism.

Figures 2, 3A:
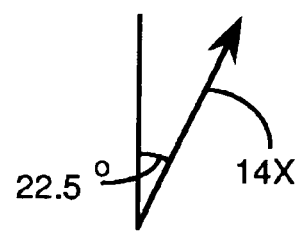
Figures 1, 3B:
Figures 2, 3B:
Figures 1, 3C:
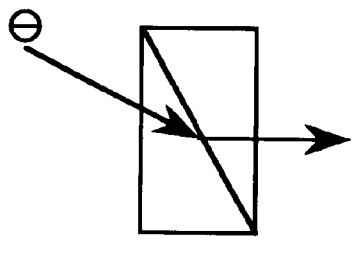
Figures 2, 3C:
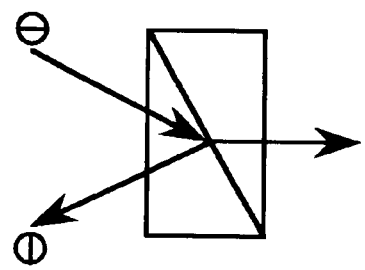

FIGS. 3A-1, 3A-2, are diagrams for showing the optical axes orientation of the half wave plates for changing the SOP of the beam components described above. FIG. 3B-1 and 3B-2, are functional diagrams for showing the angular changes of a beam polarization of the half wave plates and the Faraday rotators respectively. FIGS. 3C-1 and 3C-2 are functional diagrams for showing the deflection of the projection direction of the light beam in passing through the Wollaston prism.

Therefore, the present invention discloses an improved design and configuration for manufacturing and assembling a fiber optic circulator with reduced volume and lower costs such that the difficulties and limitations in the prior art can be overcome. Specifically, a circulator implemented with improved configuration is disclosed by employing a first set of optical components for separating and adjusting the polarization angles for preparing the light beams into beam components that are ready for projecting toward the exit-port. A polarization-dependent beam projection means, e.g., a Wollaston prism, is employed to project the beam components to the exit port direction. Then a second set of optical components arranged in reciprocal order of the first set of optical components. This second set of optical components are employed for readjusting the polarization angles and for merging the beam components according to a reversed beam processing sequences into a light beam identical to the input beam and exit from the output port. The improved configuration is realized by taking advantage of the non-reciprocal characteristic of Faraday rotator coupled with the polarization-dependent projection direction of a Wollaston prism to reduce the size of the birefringent crystals. The production cost-savings are achieved with reduced size of birefingent crystals.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical circulator comprising:
    a first eccentric dual fiber capillary having a first and a third optical port;
    a first birefringent crystal coupled to said first eccentric dual fiber capillary for separating an input optical beam entering from said first optical beam into an ordinary beam component (o-component) having a first polarization keeping an original optical path of said optical beam and an extraordinary beam component (e-component) having a second polarization perpendicular to said first polarization for transmitting in a separated optical path symmetrical to a centerline of said optical circulator;

a first pair of half wave plates comprising a first o-half-wave-plate and a first e-half-wave-plate coupled to said first birefringent crystal for receiving said o-component and e-component respectively for effecting angular rotations for aligning said first polarization of said o-component and said second polarization of said e-component into an aligned polarization;

a first Faraday rotator coupled to said first pairs of half wave plates for rotating said aligned polarization of said o-component and said e-component into a projection-to-exit port ready polarization relative to said centerline of a Wollaston prism coupled to said Faraday rotator opposite said first pairs of half-wave plates;

said Wollaston prism projecting said o-component and said e-component along a direction with both of said e-component and o-component projected on a same horizontal plane directly into an exit port in parallel to an port-and-fiber projection direction;

a second Faraday rotator coupled to said Wollaston prism for rotating said o-component and e-component into a reciprocally-symmetrical polarization relative to said aligned polarization;

a reciprocal beam polarization and merging means coupled to said second Faraday rotator wherein said reciprocal beam polarization and merging means comprising a second pair of half wave plates identical to said first pair of half wave plates coupled to a second birefringent crystal identical to said first birefringent crystal, said second birefringent crystal in turn coupled to a second eccentric fiber capillary having a second optical port wherein said second half wave plate, said second birefringent crystal and said second eccentric fiber capillary arrange in reciprocal order relative to said first eccentric dual-fiber capillary, said first birefringent crystal and said first pair of half wave plates for reciprocally rotating polarization of said o-component and said e-component and for merging said o-component and e-component into an output optical beam identical to said input optical beam for projecting from said second optical port along said exit port-and-fiber projection direction disposed on said eccentric fiber capillary.

2. An optical circulator comprising:

a beam separation and polarization means for preparing an incident light into two projection-direction-ready beam components;

a polarization-dependent beam projection means for projecting said projection-direction-ready beam components along a direction with both of said beam components projected on a same horizontal plane directly to an exit port in parallel to an exit-port-and-fiber direction; and a reciprocal means for reciprocally polarizing and merging said beam components relative to said beam separation and polarization means and projecting a merged beam generated by said reciprocal means to said exit port-and-fiber direction through an exit port.

3. The optical circulator of claim 2 wherein:

said polarization-dependent beam projection means comprising a Wollaston prism for projecting said projection-direction-ready beam components along a direction with both of said beam components projected on a same horizontal plane directly to an exit port in parallel to an exit-port-and-fiber direction.

4. The optical circulator of claim 2 wherein:

said polarization-dependent beam projection means comprising a Rochon prism for projecting said projection-direction-ready beam components along a direction with both of said beam components projected on a same horizontal plane directly to an exit port in parallel to an exit-port-and-fiber direction.

* * * * *